(12) United States Patent
Chan et al.

(10) Patent No.: US 8,356,907 B2
(45) Date of Patent: Jan. 22, 2013

(54) HOST COMPUTER WITH A PROJECTOR

(75) Inventors: Pao-Hsian Chan, Taipei (TW); Hsin-Yi Hsu, Taipei (TW); Muh-Jin Uang, Taipei (TW)

(73) Assignee: Giga-Byte Technology Co., Ltd., New Taipei (TW)

( * ) Notice: Subject to any disclaimer, the term of this patent is extended or adjusted under 35 U.S.C. 154(b) by 442 days.

(21) Appl. No.: 12/509,465

(22) Filed: Jul. 25, 2009

(65) Prior Publication Data

US 2011/0019163 A1    Jan. 27, 2011

(51) Int. Cl.
*G03B 21/14* (2006.01)

(52) U.S. Cl. ............ 353/119; 353/38; 353/79; 353/101; 353/121; 353/122; 349/7; 345/5

(58) Field of Classification Search ................ 353/7, 11, 353/12, 13, 14, 39, 43, 67, 70, 79, 97, 121, 353/122, 10, 102, 119, 120; 345/5, 87, 705, 345/716, 730, 32; 348/14.07, E5.102, E5.137, 348/744, 333.01; 349/5, 7, 8, 9
See application file for complete search history.

(56) References Cited

U.S. PATENT DOCUMENTS

| | | | | |
|---|---|---|---|---|
| 5,483,250 A | * | 1/1996 | Herrick | 345/32 |
| 5,521,660 A | * | 5/1996 | Hodson et al. | 353/122 |
| 5,658,063 A | * | 8/1997 | Nasserbakht | 353/122 |
| 5,865,522 A | | 2/1999 | Gold | |
| 5,943,050 A | * | 8/1999 | Bullock et al. | 715/783 |
| 6,262,884 B1 | | 7/2001 | Hwang et al. | |
| 6,866,388 B2 | * | 3/2005 | Yang | 353/70 |
| 7,290,885 B2 | * | 11/2007 | Salvatori et al. | 353/36 |
| 7,443,657 B2 | * | 10/2008 | Gitzinger et al. | 361/679.27 |
| 7,771,057 B2 | * | 8/2010 | Combs et al. | 353/119 |
| 7,926,958 B2 | * | 4/2011 | Choi et al. | 353/119 |
| 2002/0118151 A1 | | 8/2002 | Chen | |
| 2003/0117343 A1 | * | 6/2003 | Kling | 345/32 |
| 2004/0183762 A1 | * | 9/2004 | Kang et al. | 345/87 |
| 2006/0017887 A1 | * | 1/2006 | Jacobson et al. | 353/30 |
| 2007/0103775 A1 | | 5/2007 | Shi et al. | |
| 2007/0153461 A1 | | 7/2007 | Singh et al. | |
| 2007/0273835 A1 | * | 11/2007 | Fan et al. | 353/7 |
| 2008/0084542 A1 | * | 4/2008 | Lalley et al. | 353/10 |
| 2008/0309889 A1 | * | 12/2008 | Rivera | 353/98 |
| 2009/0322967 A1 | * | 12/2009 | Liou et al. | 348/744 |
| 2010/0309442 A1 | * | 12/2010 | Sadhu | 353/79 |

FOREIGN PATENT DOCUMENTS

| | | |
|---|---|---|
| DE | 19830968 | 1/2000 |
| DE | 202008014899 | 2/2009 |
| DE | 202008013769 | 4/2009 |
| EP | 1329797 | 7/2003 |
| JP | 2006106298 | 4/2006 |
| WO | 2004088490 | 10/2004 |
| WO | 2006094957 | 9/2006 |

* cited by examiner

*Primary Examiner* — Georgia Y Epps
*Assistant Examiner* — Sultan Chowdhury
(74) *Attorney, Agent, or Firm* — Chun-Ming Shih (57) ABSTRACT

A host computer includes a host machine and a projector. The host machine has a keyboard. The projector is positioned about the keyboard and includes a projection lens. A using position of the projection lens is higher than a received position of the projection lens.

7 Claims, 9 Drawing Sheets

HOST COMPUTER WITH A PROJECTOR

BACKGROUND

The present invention relates to host computers and, more particularly, to a host computer with a projector.

With the development of technology, notebook computers and projectors are now in widespread use. Electronic products are prone to be smaller and thinner in design. Consequently, the functions of a notebook computer and a projector are generally independent. Thus, a transmission line is needed to connect the notebook computer and the projector, so that information in the notebook computer can be shown via the projector. As for users, if a user makes a report in a customer's company or a supplier's company, he/she has to take with transmission line besides a notebook computer and peripheral devices of the notebook computer. It is very inconvenient.

In addition, projectors in the market can only transmit an image onto a target screen in front. If the projector is fixed to an immovable thing, such as a table, the projecting direction of the projector cannot be changed. In other words, the projecting direction of the projector can be adjusted only if the projector is moved or rotated. However, a distance between the notebook computer and the projector is limited by the length of the transmission line. Furthermore, when the user needs to make a report away from his/her seat, another person is required to switch pages of the report. Otherwise, the user not only needs to leave his/her seat but also needs to switch pages by himself/herself, thereby causing the meeting running not smoothly. Moreover, the meeting is unable to be held if the customer does not provide a projector, which may make a bad impression on the customer and cause a loss of working performance.

BRIEF SUMMARY

The present invention provides a host computer with a projector which is convenient for using.

To achieve at least one of the above-mentioned advantages or other advantages, the present invention provides a host computer with a projector. The host computer includes a host machine and a projector. The host machine has a keyboard. The projector is positioned around the keyboard and includes a projection lens. A using position of the projection lens is higher than a received position of the projection lens.

In an embodiment of the present invention, the projector includes a connecting member interconnecting the host machine and the projection lens. The host machine is a notebook computer. The connecting member includes a first distal end and a second distal end rotatably connected to the first distal end, the first distal end is rotatably attached to the host machine, and the projection lens is rotatably attached to the second distal end. The projection lens moves from the received position to the using position via rotating the first distal end of the connecting member. A projecting direction the projection lens is adjustable via rotating the second distal end of the connecting member. A projecting angle of the projection lens is adjustable via rotating the projection lens.

In another embodiment of the present invention, the projector includes a connecting member interconnecting the host machine and the projection lens. The host machine is a notebook computer. The connecting member is a serpentine tube having both flexible and hard characteristics. Projecting direction and angle of the projection lens are adjustable via bending the serpentine tube randomly.

The host computer with a projector integrates the functions of a projector and a host machine. Projecting direction and angle of the projection lens are adjustable. A user only needs to take with a single host computer. Accordingly, compared with the conventional, the user usually has to take with a transmission line along a notebook computer and peripheral devices of the notebook computer. In other words, the host computer with a projector of the present invention is very convenient for using.

BRIEF DESCRIPTION OF THE DRAWINGS

These and other features and advantages of the various embodiments disclosed herein will be better understood with respect to the following description and drawings, in which like numbers refer to like parts throughout, and in which.

Other objectives, features and advantages of the present invention will be further understood from the further technological features disclosed by the embodiments of the present invention wherein there are shown and described preferred embodiments of this invention, simply by way of illustration of modes best suited to carry out the invention.

DETAILED DESCRIPTION

Figure 1:
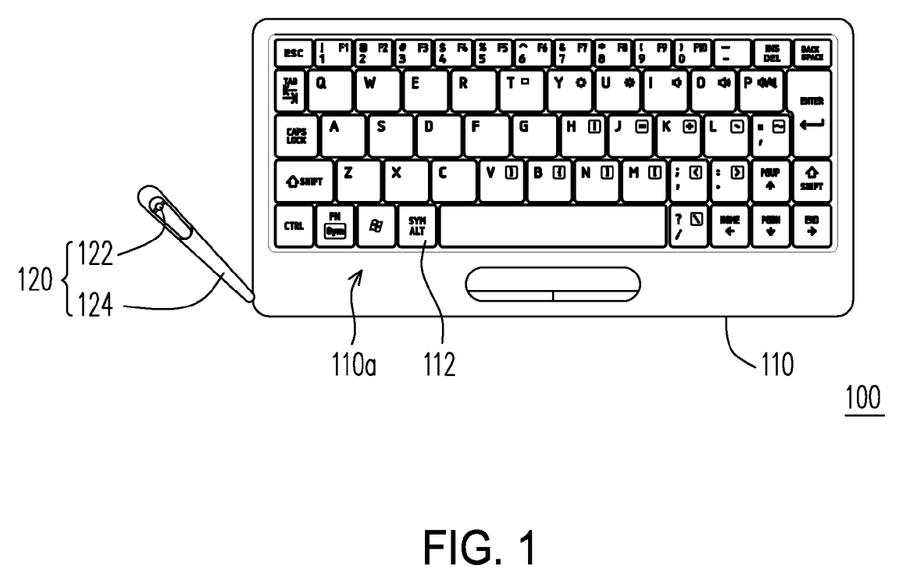
FIG. 1 is a schematic, top plan view of a host computer with a projector in accordance with the present invention.

FIG. 1 is a schematic, top plan view of a host computer with a projector in accordance with the present invention. Referring to FIG. 1, the host computer with a projector 100 includes a host machine 110 and a projector 120. The host machine 110, which has a keyboard 112 and a top surface 110a, may be a host machine of a notebook computer. The keyboard 112 is disposed on the top surface 110a. The projector 120 is positioned around the keyboard 112 and provides with a projection lens 122.

Figure 2:
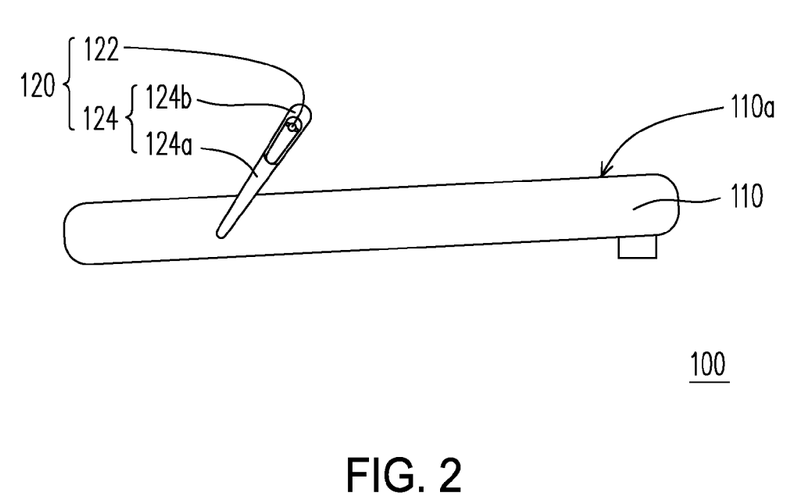
FIG. 2 is a side view of the host computer with a projector of FIG. 1.
Figure 3:
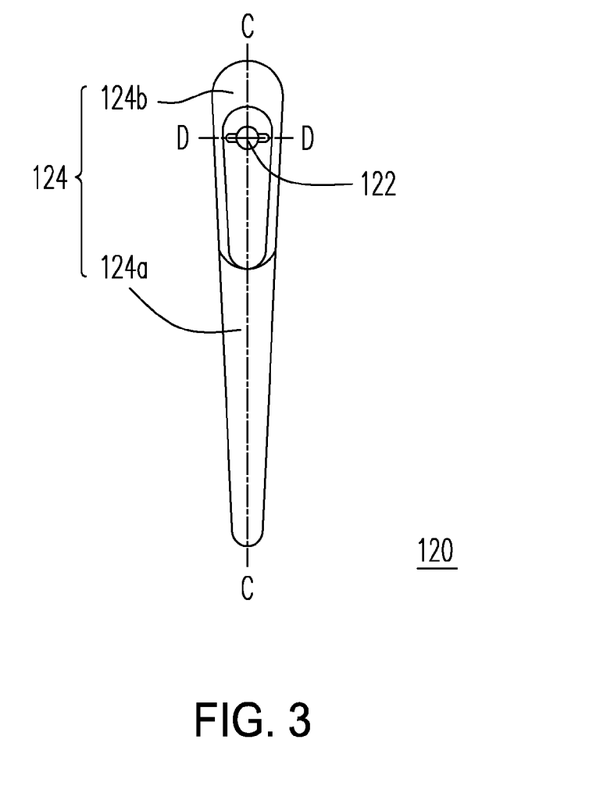
FIG. 3 is a schematic view of a projector of FIG. 2.

FIG. 2 is a side view of the host computer with a projector of FIG. 1, and FIG. 3 is a schematic view of a projector of FIG. 2. Referring to FIGS. 2 and 3 together, the projector 120 further includes a connecting member 124 interconnecting the host machine 110 and the projector 120. In this embodiment, the connecting member 124 is a tube made of hard materials. The connecting member 124 includes a first distal end 124a and a second distal end 124b rotatably connected to the first distal end 124a. The second distal end 124b is rotatable relative to the first distal end 124a about the central axis C-C of the connecting member 124.

The first distal end 124a of the connecting member 124 is rotatably attached to the host machine 110. The projection lens 122 is rotatably attached to the second distal end 124b of the connecting member 124 via a pivot shaft (not labeled). The projection lens 122 is rotatable relative to the second distal end 124b about the axial line D-D of the pivot shaft. Since the second distal end 124b is rotatable relative to the first distal end 124a about the central axis C-C of the connecting member 124, the projection lens 122 is able to rotate left or right about the central line C-C.

In alternative embodiment, the connecting member 124 may be other members having both flexible and hard characteristics, such as a serpentine tube.

Figure 4:
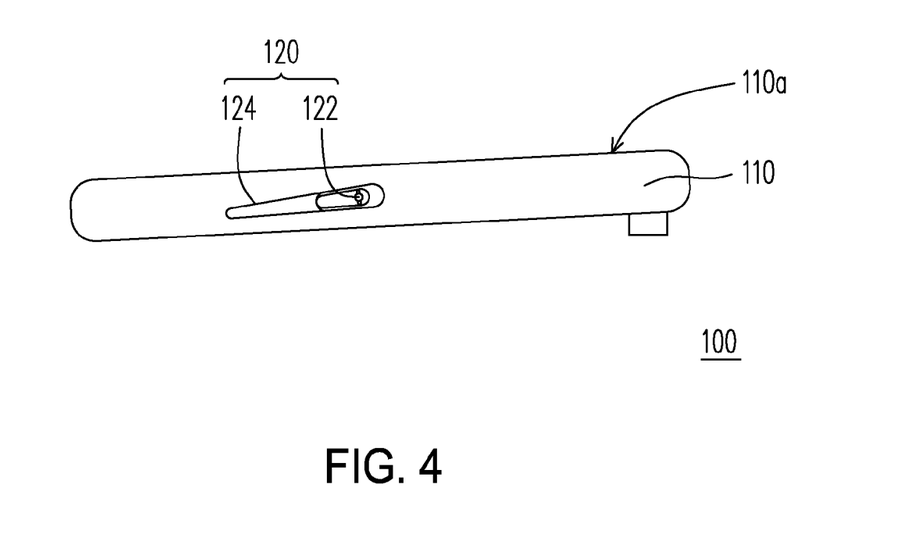
FIG. 4 is similar to FIG. 2, but showing the projector in a received position.

Additionally, the projector 120 of FIG. 2 is located at a using position. The projector 120 of FIG. 4 is located at a received position. Referring to FIGS. 2 and 4 together, the using position of the projection lens 122 is higher than the received position of the projection lens 122. As shown in FIG. 4, the projector 120 is located at the received position, that is, the projector 120 is idle and received on a side of the host machine 110. The received position of the projection lens 122 is lower than or as high as the top surface 110a of the host machine 110.

As shown in FIG. 2, in use, the first distal end 124a of the connecting member 124 is rotated relative to the host machine 110, which makes the projection lens 122 of the projector 120 be above the top surface 110a. When the projector 120 is in used, the height of the projection lens 122 should be higher than that of the top surface 110a. In this way, the image from the projection lens 122 is not sheltered by the host machine 110.

It should be understood that, if the projection lens 122 is much too near the host machine 110, the host machine 110 may shelter the image from the projection lens 122, thereby resulting in an incomplete image on a projection screen. Therefore, in use, the height of the projection lens 122 should be much higher than that of the top surface 110a of the host machine 110, so as to display a complete image on the projection screen.

In addition, when a user needs to adjust a projecting direction of the projection lens 122, he/she can make the second distal end 124b rotate relative to the first distal end 124a about the central line C-C. Accordingly, the projection lens 122, together with the second distal end 124b, is able to rotate left or right. After that, the projection lens 122 is rotated upward or downward about the axial line D-D, so that a projecting angle of the projection lens 122 is also adjusted.

As mentioned above, the host computer with a projector 100 of this embodiment is very convenient for using. The user needn't worry about a lack of a projector. Further, when the user makes a report in a meeting, he/she can simultaneously operate the projecting direction of the projection lens 122 and turn pages of the report. Therefore, the meeting convenes more smoothly.

Alternatively, the host computer with a projector 100 of this embodiment may further include a display on basis of current conditions. For instance, the host machine 110 of the host computer with a projector 100 is a host machine of a notebook computer. Since the notebook computer generally includes a display, the user can use the host machine 110 and the display to edit documents. If the user has other requirements, such as reducing the volume, size and/or weight of the host computer with a projector 100, the display may be omitted. In such cases, the user can use the host computer with a projector 110 and an external projection screen to edit the documents. The external projection screen may be a cloth screen or a wall having a flat surface.

Figure 5:
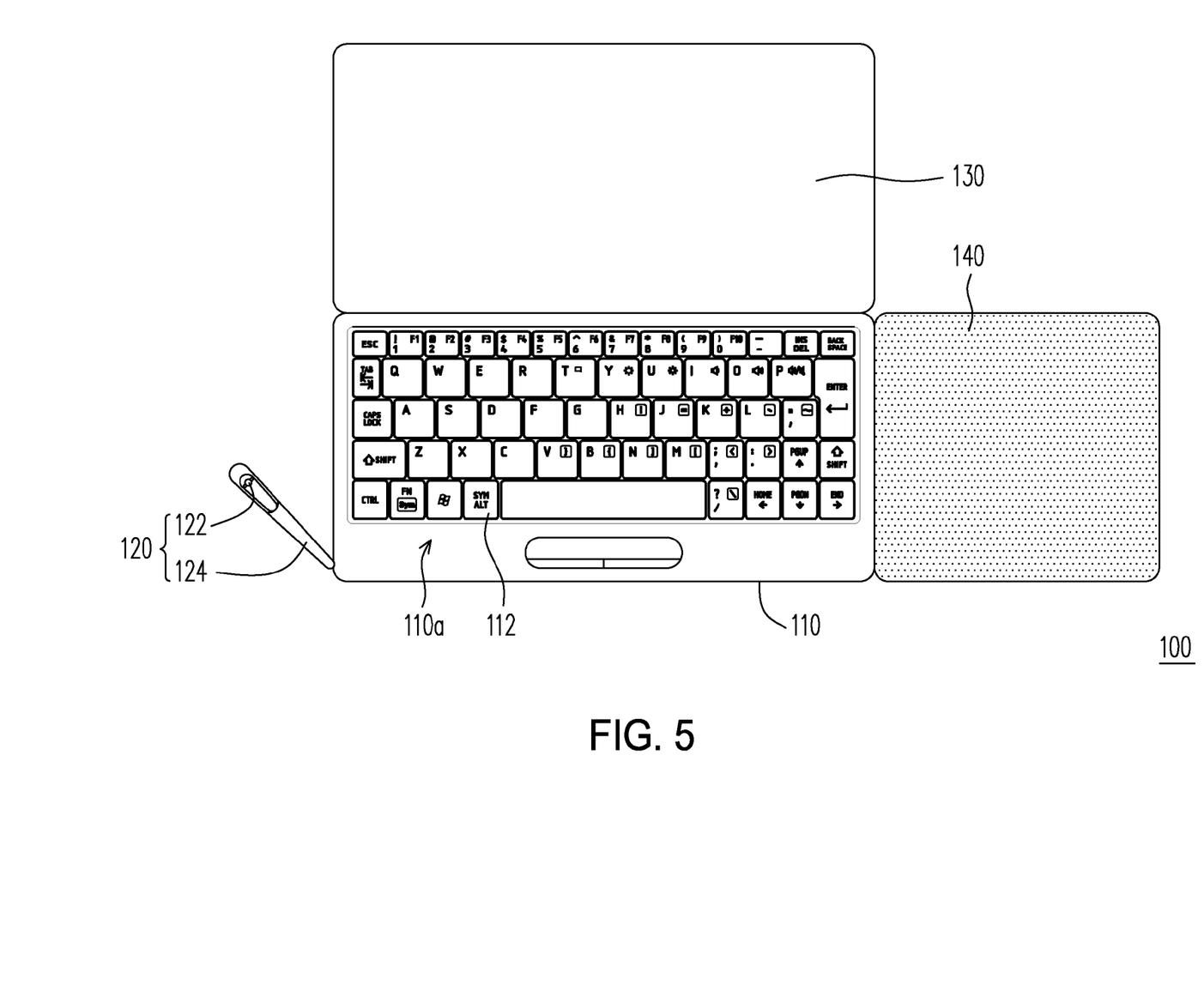
FIG. 5 is a schematic, top plan view of a projection screen pulled out of the host computer with a projector of FIG. 1.

FIG. 5 is a schematic, top plan view of a projection screen pulled out of the host computer with a projector of FIG. 1. Referring to FIG. 5, the host computer with a projector 100 further includes a projecting screen 130 connected to the host machine 110. The projecting screen 130 is adapted for pulling out from a side of the host machine 110. In specific, the projection screen 130 is a cloth screen. The projection screen 130 may be a roll screen, that is, the projection screen 130 is rolled up when unused. The projection screen 130 may be disposed in the host machine 110. When the projection screen 130 needs using, the user unrolls the projection screen 130 from a side of the host machine 110.

In alternative embodiment, the projection screen 130 may be a drag screen. When the projection screen 130 is idle, the projection screen 130 is received under or on a side of the host machine 110. When the projection screen 130 needs using, the projection screen 130 is pulled out from a side of the host machine 110. A using size of the projection screen 130 may vary according to the user's requirements. The configuration of the projection screen 130 depends on mechanical design requirements, and is in no way limiting.

It should be pointed out that, in order to meet the user's requirements, a size of the image shown on the projection screen 130 may be automatically adjusted according to the using size of the projection screen via a software or a sensor, thereby preventing the size of the image from being too small or too large.

Figure 6A:
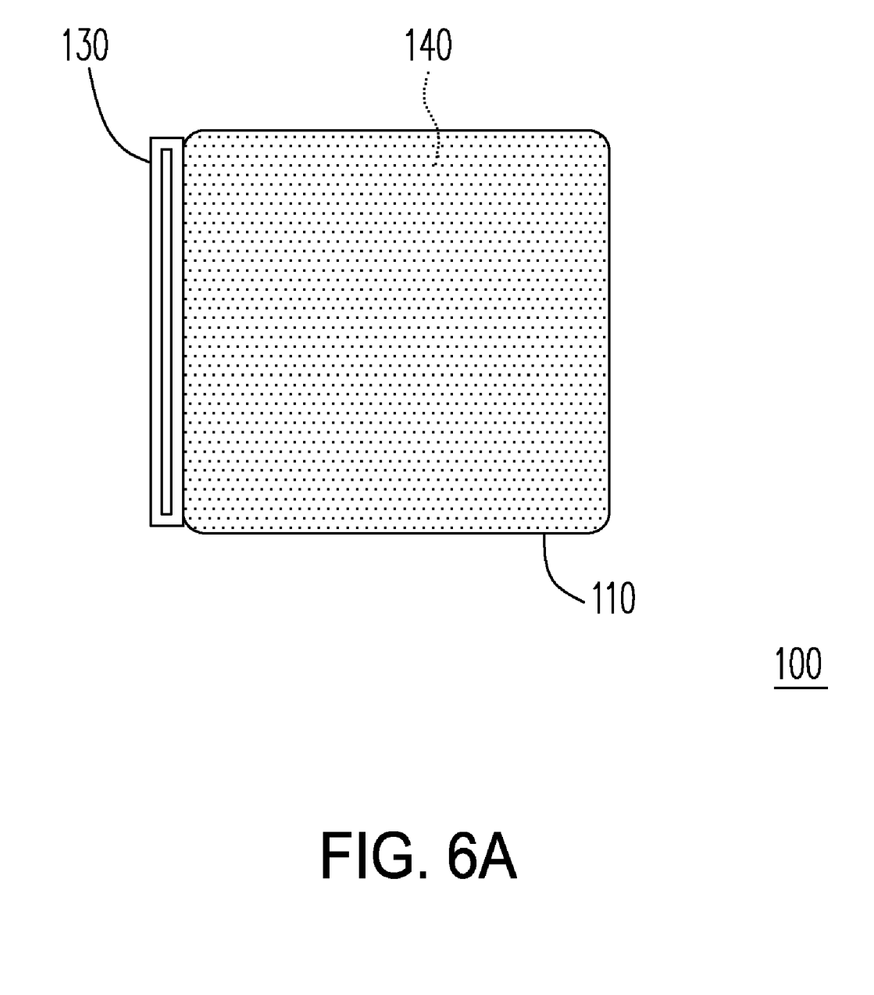
FIGS. 6A-6E are flow, schematic, top plan views of using the host computer with a projector of FIG. 1.

FIGS. 6A-6E are flow, schematic, top plan views of using the host computer with a projector 100. As shown in FIG. 6A, the projecting screen 130 and the projector 120 are received on a same side of the host machine 110. The host machine 110 is foldable. The host computer with a projector 100 further includes a cover 140 configured for covering on the folded host machine 110.

Figure 6B:
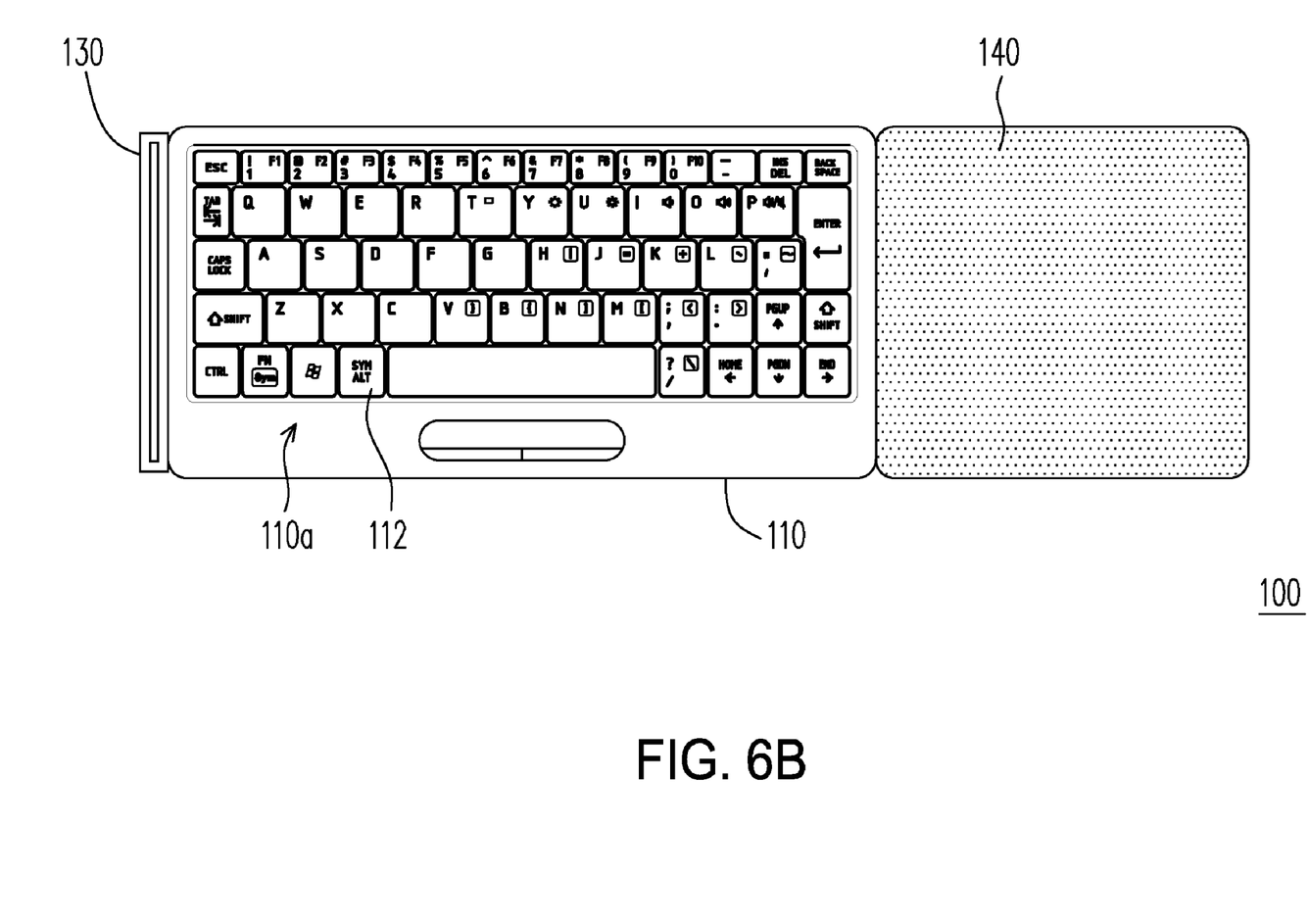
Figure 6C:
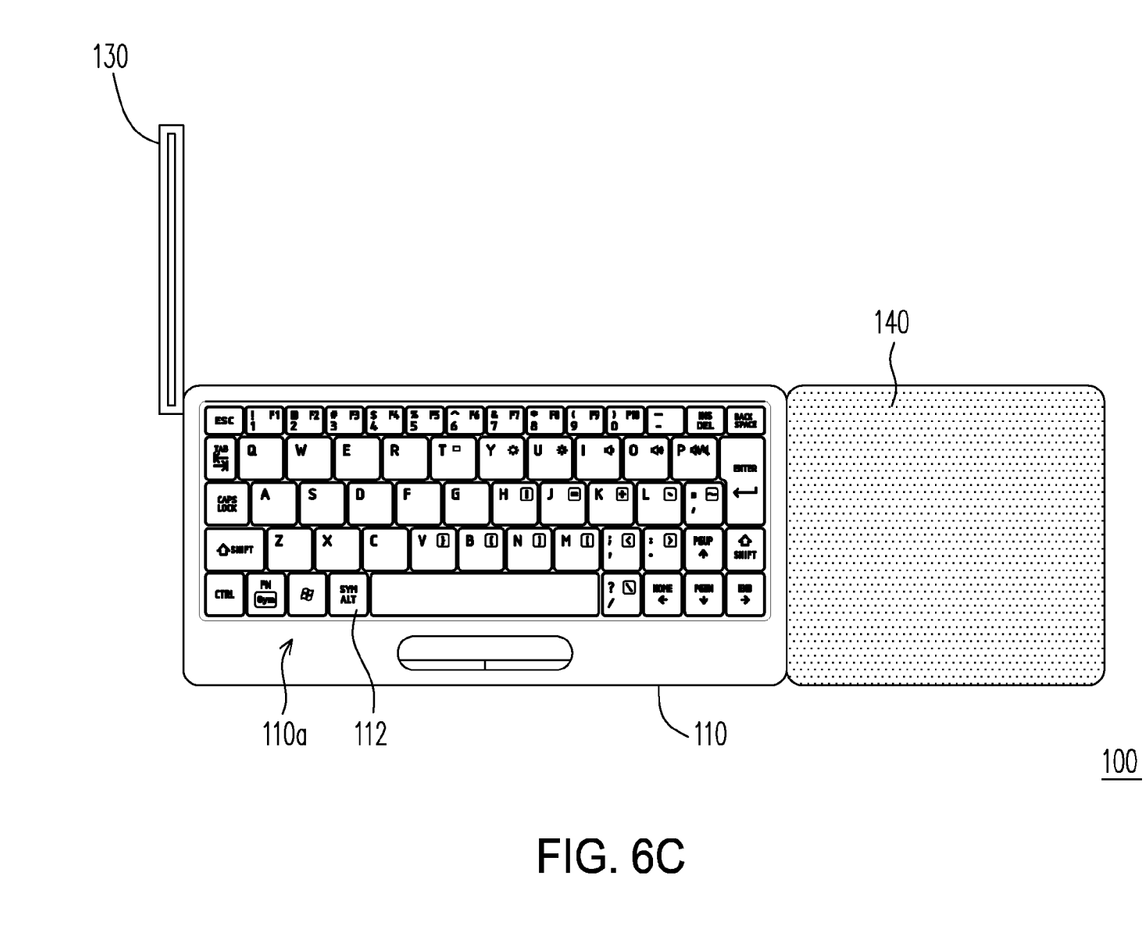
Figure 6D:
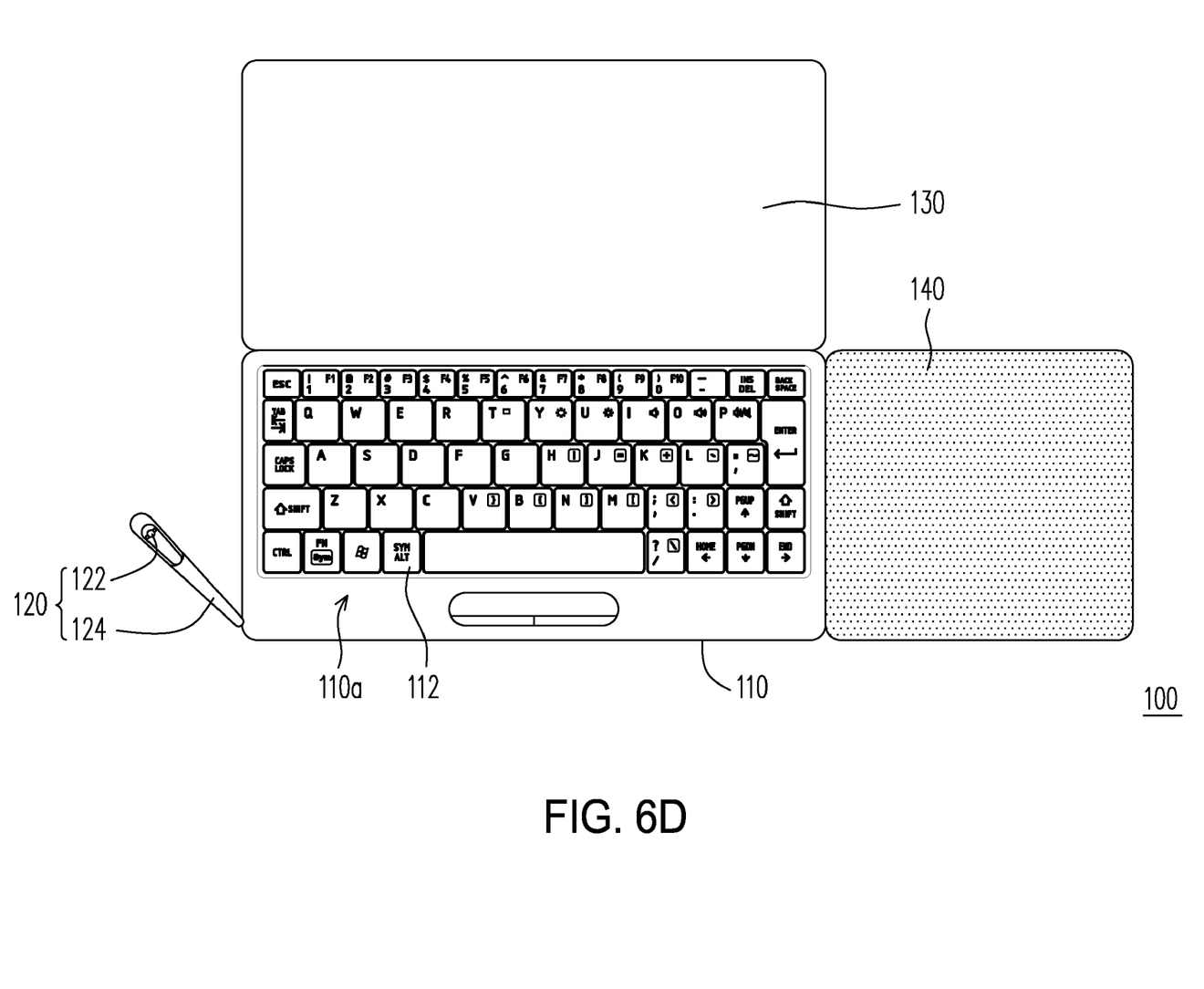
Figure 6E:
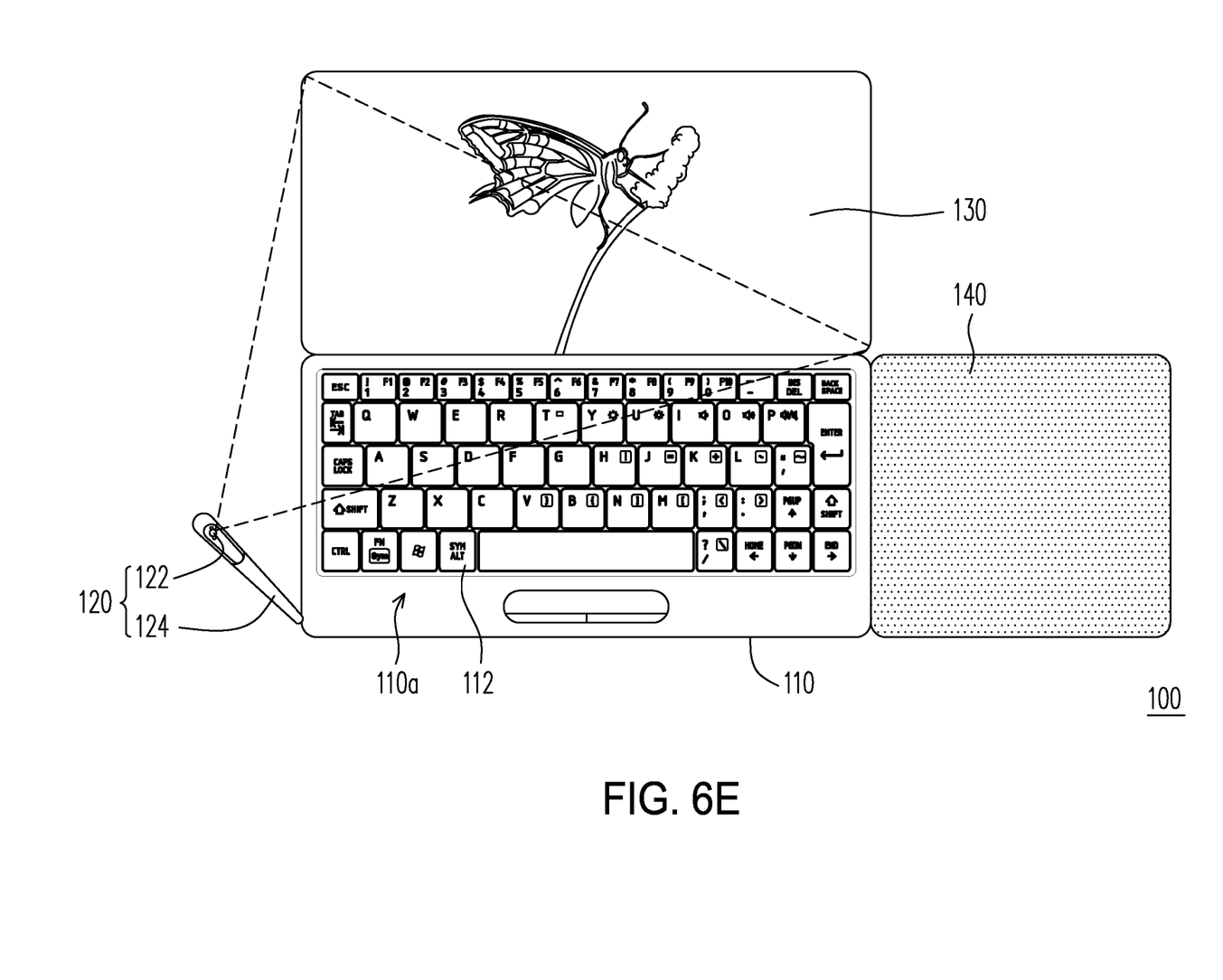

As shown in FIG. 6B, when the host computer with a projector 100 is in used, the user opens the cover 140, then unfolds the host machine 110 and the keyboard 112. After that, as shown in FIG. 6C, the projection screen 130 is pulled upward. As shown in FIG. 6D, the projection screen 130 is opened towards the right. The projector 120 is moved towards the user until the projector 120 reaches a using position. At last, as shown in FIG. 6E, the projection lens 122 of the projector 120 transmits the image onto the projection screen 130.

Figure 7:
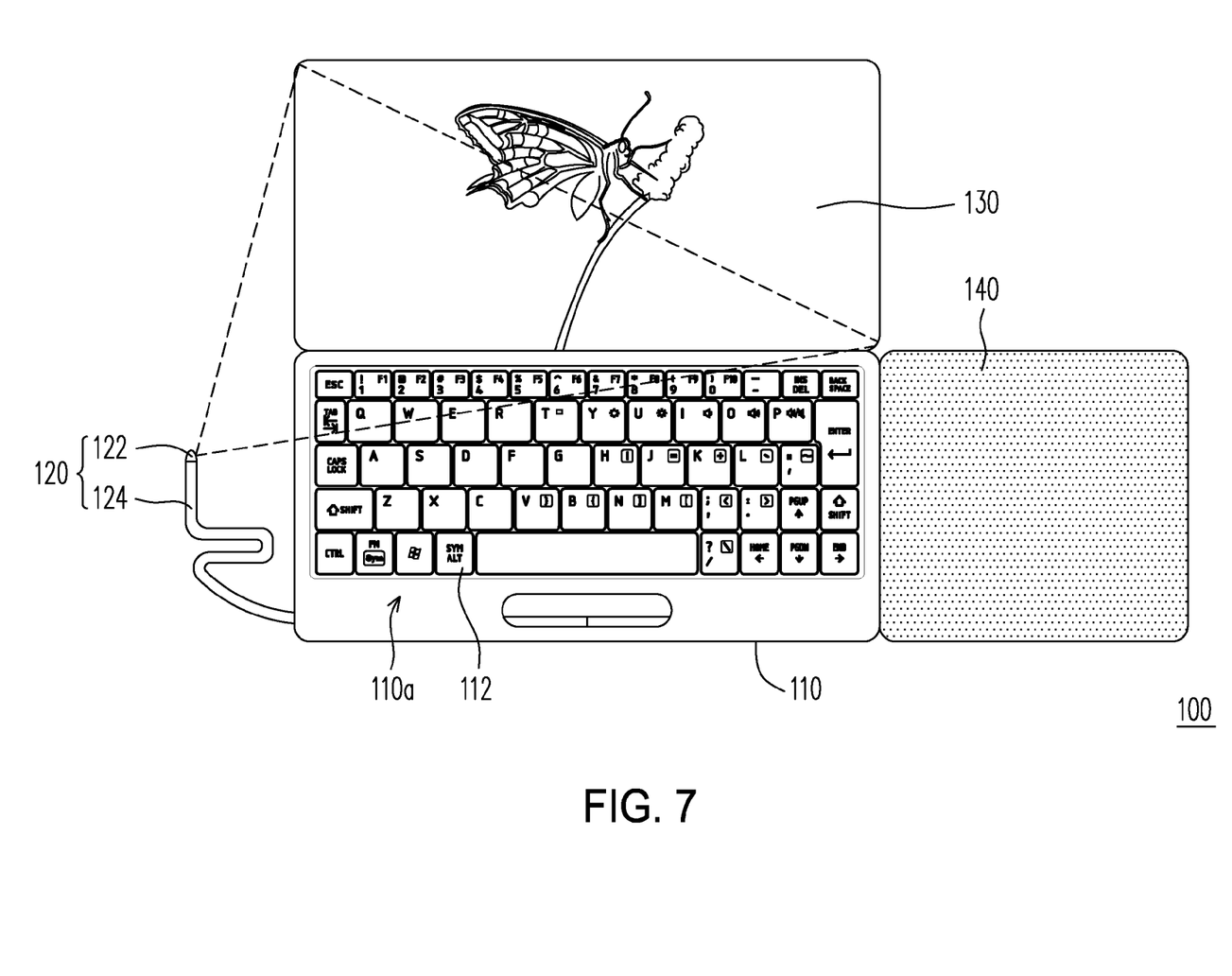
FIG. 7 is a schematic view of the host computer with a projector, showing a serpentine tube acted as a connecting member.

FIG. 7 is a schematic view of the host computer with a projector, showing a serpentine tube acted as a connecting member. Referring to FIG. 7, the connecting member 124 is a serpentine tube. The serpentine tube has both flexible and hard characteristics, so that the user can randomly bend the serpentine tube to adjust a height of the projection lens 122. Therefore, a projecting direction and angle of the projection lens 122 are adjustable.

In other embodiments not shown in drawings, the projector 120 can be directly disposed on the host machine 110, and still on a side of the keyboard 112. For example, the host machine 110 may includes a switch cover configured for covering on the top surface 110a. When the switch cover is opened relative to the top surface 110a, the projection lens 122 can move together with the switch cover. During the opening of the switch cover, the projection lens 122 moves from the received position to the using position. The foregoing description of the projector 120 and the host machine 110 of the invention has been presented for purposes of illustration and description. There are a plurality of configurations of the projector 120, and persons skilled in the art may vary the configurations of the projector 120 according to current requirements.

In summary, the host computer with a projector 100 of the present invention integrates the functions of a projector 120 and a host machine 110. As such, the host computer with a projector is not only used as a computer but also used as a projector. In addition, the projection lens 122 of the projector 120 is moveable, so that the user can randomly adjust the projecting direction of the projector 120. Further, the user can independently operate the host computer with a projector 100 in a meeting, which increases the smoothness of the meeting. The user can also enjoy a family theater when the host computer with a projector 100 is used at home. Thus, the host computer with a projector 100 is very convenient for using.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A host computer with a projector comprising:
    a host machine having a keyboard; and
    a projector comprising a projection lens and a connecting member interconnecting the host machine and the projection lens, wherein the projection lens is rotatable about the connecting member, a using position of the projection lens is higher than a received position of the projection lens, the connecting member is rotatably attached to the host machine and positioned about the keyboard of the host machine, and the connecting member further comprises a first distal end and a second distal end rotatably connected to the first distal end, the first distal end is rotatably attached to the host machine, and the projection lens is rotatably attached to the second distal end,
    wherein the projection lens move from the received position to the using position via rotating the first distal end of the connecting member, a projecting direction of the projection lens is adjustable via rotating the second distal end of the connecting member, and a projecting angle of the projection lens is adjustable via rotating the projection lens.

2. The host computer with a projector according to claim 1, wherein the connecting member is a serpentine tube having both flexible and hard characteristics.

3. The host computer with a projector according to claim 1, further comprising a projection screen connected to the host machine, the projection screen being adapted for pulling out from a side of the host machine.

4. The host computer with a projector according to claim 3, further comprising a cover, the host machine being foldable, and the cover configured for covering on the folded host machine.

5. The host computer with a projector according to claim 1, wherein the host computer with a projector further comprises a switch cover configured for covering on the host machine, during the opening of the switch cover, the projection lens moves from the received position to the using position.

6. The host computer with a projector according to claim 3, wherein the projection screen is a scroll or a drag screen.

7. The host computer with a projector according to claim 1, wherein the host machine is a host machine of a notebook computer.

* * * * *